United States Patent Office 2,751,619
Patented June 26, 1956

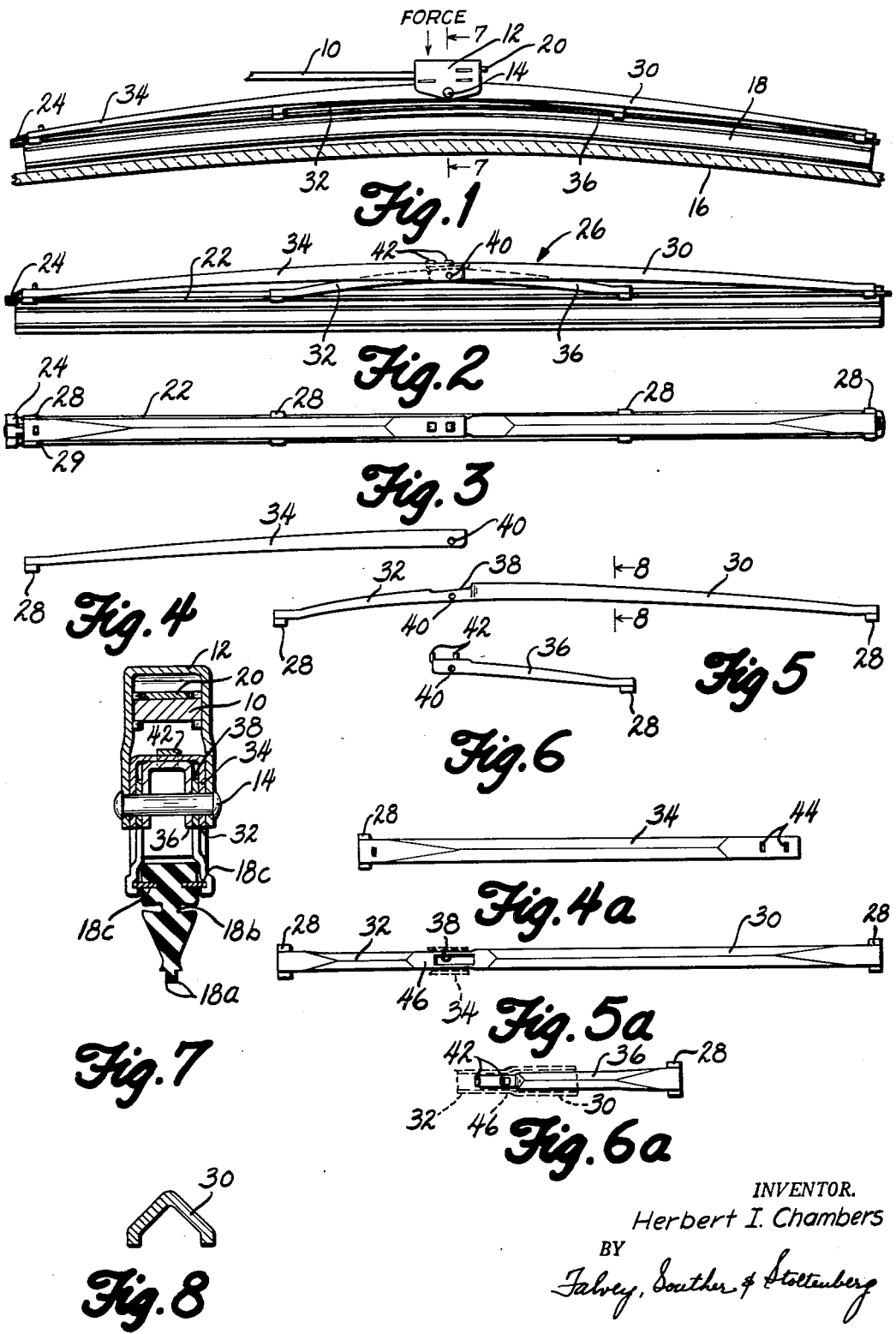
June 26, 1956 — H. I. CHAMBERS — 2,751,619
WINDSHIELD WIPER BLADE FOR CURVED GLASS
Filed Dec. 31, 1952
INVENTOR.
Herbert I. Chambers
BY
Falvey, Souther & Stoltenberg

2,751,619

WINDSHIELD WIPER BLADE FOR CURVED GLASS

Herbert I. Chambers, Toledo, Ohio

Application December 31, 1952, Serial No. 328,998

10 Claims. (Cl. 15—245)

This invention relates to windshield wiper blades, more particularly to wipers for curved windshields including a flexible backing strip and a pressure-distributing mechanism to equalize pressure applied from a point source consisting of an attaching means on the end of an oscillating arm.

The invention disclosed is an improvement on the blade described and claimed in application Serial No. 228,448, filed May 26, 1951, assigned to the same assignee.

The invention contemplates the provision of a wiper blade for curved windshields which has a streamlined appearance as well as a streamlined shape so as to reduce wind friction when utilized in the slip stream of an automobile moving at a high rate of speed. The invention further contemplates the provision of a wiper blade which is suited for mass production.

It is, therefore, a principal object of this invention to provide a wiper blade for use with curved windshields which is of improved appearance to enhance the beauty of an automotive vehicle with which it is to be used.

It is a further object of this invention to provide a wiper blade which is streamlined to offer a minimum of resistance during oscillating movement in the slip stream of a fast-moving automotive vehicle to thereby reduce the power required to operate the blade.

It is a further object of this invention to provide a wiper blade which is conformed to suit mass production methods.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. 1 is an elevational view from the side of the wiper blade shown in contact with the glass of a curved windshield;

Fig. 2 is a similar elevational view with the arm attaching means removed shown in relaxed position without application of pressure;

Fig. 3 is a plan view of Fig. 2;

Figs. 4, 5, and 6 are elevational views of the principal parts of the pressure-distributing means;

Figs. 4a, 5a, and 6a are corresponding plan views of the parts;

Fig. 7 is a sectional elevation taken along line 7—7 of Fig. 1; and

Fig. 8 is a sectional elevation taken along line 8—8 of Fig. 5.

Referring to the drawings, particularly to Fig. 1, an oscillating arm 10 is shown to which the wiper blade is attached by means of a manually-operable clasp 12 as shown and claimed in application Serial No. 231,291, filed June 13, 1951, assigned to the same assignee. The clasp 12 is pivotally attached to the blade assembly by means of rivet 14, which serves to hold the pressure-distributing parts of the blade in operative relation and, at the same time, serves as a pivot point, about which the blade, as a whole, may rotate with reference to the arm 10, so that the blade can adjust itself to the windshield glass 16 as it is oscillated in an arc over the glass. The glass 16 of the windshield is curved, preferably in the form of a cylindrical surface, having its longitudinal axis at an angle with the perpendicular to provide a rearward slope for the windshield as is well known in the art. In oscillating over its predetermined arc over the curved glass, the wiper blade or squeegee element 18 constantly varies its curvature from a straight line to one of maximum curvature to cleanse the glass from foreign substances.

The wiper blade, as a whole, is removable from the end of the oscillating arm 10, by manual actuation of the catch 20 incorporated in the clasp 12, all as described in the aforementioned application.

The squeegee element may take many forms, one of which is illustrated and shown in cross-section in Fig. 7. Generally, it is made of very flexible rubber, provided with a pair of wiping edges 18a at its lower terminus, and a central longitudinally-extending attenuated portion 18b, about which it flops as it is moved in the different directions across the glass. Above the attenuated portion 18b, grooves 18c are provided in juxtaposed position to fit a metal spring backing strip 22, preferably in the form of a U-shaped member, into which the squeegee element is slidable from its open end, being locked therein by a holder 24 substantially as shown in the first application referred to above.

Positioned between the backing strip 22 and the clasp 12, a pressure-distributing means 26 is provided, which equally distributes the pressure applied by the arm 10 to four points on the backing strips, two of the points being located at the ends of the strip, while the other two are positioned at equally spaced points from the others along the blade between the ends. The pressure on the backing strip is applied to its outer edge extending beyond and outwardly from the main body of the rubber squeegee as is best seen in Fig. 7, by means of pairs of claws 28, formed integral with the ends of the four longitudinally-extending arms of the pressure-distributing means 26 to be described further hereinafter. The pair of claws co-operating with the open end of the backing strip 22 engage into slots 29 in the sides thereof to prevent longitudinal disengagement of the claws from the strips to hold the parts permanently in engagement, but disengageable by manual manipulation, should it be desirable to substitute a new element in the assembly. In the same manner, the squeegee 18 is manually replaceable, should such become necessary, by first removing the holder 24.

The pressure-distributing means 26 comprises four longitudinally-extending arms 30, 32, and 34, 36, two of which 30, 32 are integrally associated, as shown in Fig. 5, while the other two 34, 36 are made as separate pieces (Figs. 4 and 6) which, after being fitted together, are locked together in position to function as an integral member. In this way, the longer arms 30, 34 are positioned above or outwardly with reference to the flexible backing strip 22, while the shorter arms 32, 36 are nested within the longer arms adjacent to and just above the backing strip. Both pairs of arms are pivotally associated about rivet 14 and are thereby made mutually reactive to distribute the pressure applied by the arm through the agency of the clasp 12.

The internesting of the reactive arms is accomplished through a slot 38 adjacent the holes 40, through which the rivet 14 extends, by having the inner end of the shorter arm 36 fit below the slot 38 in nesting relation with the longer arm 30 (shown in phantom in Fig. 6a), so that lugs 42 struck upwardly from the arm 36 extend through the slot 38, where they engage with aligning transverse slots 44 in the inner end of the longer arm 34, which nests over the attenuated portion 46 of the integral pair of arms 30, 32 as shown in phantom in Fig. 5a. After the lugs 42 in the short arm 36 are engaged in the slots 44 of the longer arm portion 34, they are bent over as shown in Fig. 2 to provide a holding means to lock the arms 34 and 36 together to function as an integral member. All the holes 40 in the three pieces are brought into alignment and the rivet 14 is fitted through and also through the clasp 12 and thereafter peened over.

The arm pairs 30, 32 and 34, 36 become mutually reactive about the pivot point 14 and distribute the arm-applied pressure at the pivot point substantially equally to the spaced claws 28 movably cooperating with the flexible backing strip 22, which causes the squeegee to contact the curved glass at substantially all points as the squeegee is oscillated over its predetermined arc to perform its cleansing operation. The mutual reactive characteristic conforms the squeegee to the curved glass from a straight line to a curved one as it moves through its arc.

The outer surface of the arms 30, 32, 34 and 36 are contoured as shown in Fig. 8, which gives a pleasing aspect to the blade to an observer, but also has a functional aspect that the inverted V-shape channel with its angularly arranged, or oblique faces reduce the action of the wind of the slip stream, and provide a component of force through wind action which increases the pressure of the squeegee on the glass rather than reducing the pressure to cause the blade under very adverse conditions to lift from the glass entirely as was often the case with blades shown in the prior art.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. In a windshield wiper suitable for use with a planar or curved windshield surface, a wiper member comprising a flexible body having a wiping edge, a flat spring member attached to the flexible body substantially throughout its length for supporting said flexible body, said flat spring member having its broad surface in parallel juxtaposition to the windshield surface being wiped, a pair of arcuate nested yokes pivoted together intermediate their ends and attached at their ends to the spring member at four spaced points, and means for attaching said wiper member to an oscillating arm at the pivot point, each of said yokes having outer portions extending from the pivot point to the ends of the spring member and inner portions extending oppositely from the pivot point to intermediate points on said spring member, whereby force applied by the oscillating arm to the pivot point flexes the spring member and the flexible body to conform to the windshield surface being wiped.

2. In a windshield wiper suitable for use with a planar or curved windshield surface, a wiper member comprising a flexible body having a wiping edge, a flat spring member attached to the flexible body substantially throughout its length for supporting said flexible body, said flat spring member having its broad surface in parallel juxtaposition to the windshield surface being wiped, a pair of longitudinally-extending nested yokes pivoted together at a central point of the wiper and attached at their ends to the spring member at four spaced points, and means for attaching said wiper member to an oscillating arm at the pivot point, each of said yokes having outer inverted V-shaped portions extending from the pivot point to the ends of the spring member and inner portions oppositely extending from the pivot point to intermediate points on said spring member, whereby force applied by the oscillating arm to the pivot point flexes the spring member and the flexible body to conform to the windshield surface being wiped.

3. In a windshield wiper suitable for use with a planar or curved windshield surface, a wiper member comprising a flexible body having a wiping edge, a flat spring member attached to the flexible body substantially throughout its length adjacent its upper edge for supporting said flexible body, said flat spring member having its broad surface in parallel juxtaposition to the windshield surface being wiped, a pair of nested yokes pivoted together in unbalanced relation at a central point of the wiper and attached at their ends to the spring member at its edges at four spaced points, and means for attaching said wiper member to an oscillating arm at the pivot point, each of said yokes having outer portions extending from the pivot point to the ends of the spring member and inner portions extending oppositely from the pivot point to intermediate points on said spring member, whereby force applied by the oscillating arm flexes the spring member and the flexible body uniformly throughout its length to conform to the windshield surface being wiped.

4. In a windshield wiper suitable for use with a planar or curved windshield surface, a wiper member comprising a flexible body having a wiping edge, a flat spring member attached to the flexible body substantially throughout its length adjacent its upper edge for supporting said flexible body, said flat spring member having its broad surface in parallel juxtaposition to the windshield surface being wiped, a pair of nested yokes pivoted together at a central point of the wiper to provide unbalanced arms, the ends of which are attached to the spring member at its edges at four spaced points, and means for attaching said wiper member to an oscillating arm at the pivot point, each of said yokes having its outer relatively longer arm extending from the pivot point to the ends of the spring member and its inner relatively shorter arm extending oppositely from the pivot point to intermediate points on said spring member, whereby force applied by the oscillating arm flexes the spring member and the flexible body uniformly throughout its length to conform to the windshield surface being wiped.

5. In a windshield wiper for a curved windshield, a wiper blade made of flexible material which is normally straight, a flexible metallic backing member for said wiper blade gripping the wiper blade substantially throughout its entire length, attaching means comprising a pair of nesting unbalanced yokes pivoted together at a central point of the wiper blade and directly connected at their ends to the edges of the backing member at four spaced points whereby said blade can be attached to an oscillating arm by the pivot point of the yokes, each of said yokes having outer portions extending from the pivot point to the ends of the backing member and inner portions extending oppositely from the pivot point to intermediate points on said backing member, and means for connecting the wiper to an actuating arm at the pivot point, said blade being normally straight but adapted under pressure exerted by the arm on the pivot of the yokes attached to the backing member to cause the blade to continuously vary its shape as it passes over the curved surface of the windshield.

6. In a windshield wiper for a curved windshield, a wiper blade made of flexible material which is normally straight, a flexible metallic backing member for said wiper blade gripping the wiper blade substantially throughout its entire length, attaching means comprising a pair of nesting interlocking yokes pivoted together at a central point of the wiper and directly connected at their ends to the edges of the backing member at four spaced points, each of said yokes having outer portions extending from the pivot point to the ends of the backing member and inner portions positioned under the outer portions of the other yoke extending from the pivot point to intermediate points on said backing member, and means for connecting the wiper to an actuating arm at the pivot point, said blade being normally straight but adapted under pressure exerted by the arm on the pivot of the yokes attached to the backing member to cause the blade to continuously vary its shape as it passes over the curved surface of the windshield.

7. A mutually reactive yoke means for distributing pressure from a point source to the flexible backing strip of a windshield wiper for curved glass, comprising a pair of functionally integral interlocking yokes pivoted at a central point of the windshield wiper to provide a point source for application of pressure, said yokes each having outer portions extending from the pivot point to the ends of the flexible backing strip and inner portions extending oppositely from the pivot point to intermediate portions of said backing strip.

8. A mutually reactive yoke means for distributing pressure from a point source to the flexible backing strip of a windshield wiper for curved glass, comprising a pair of functionally integral interlocking yokes pivoted intermediate their ends at a central point of the flexible backing strip to provide a point source for application of pressure, said yokes each having outer portions and inner portions of unequal length extending from the pivot point in mutually opposed relation, whereby the outer portions are connected to the ends of the backing strip and the inner portions to intermediate points.

9. A mutually reactive yoke means for distributing pressure from a point source to the flexible backing strip of a windshield wiper for curved glass, comprising a pair of functionally integral interlocking yokes pivoted intermediate their ends at a central point of the backing strip to provide a point source for application of pressure, said yokes each having long outer portions and relatively shorter inner portions extending from the pivot point in mutually opposed relation whereby the outer portions are connected to the ends of the backing strip and the inner portions to intermediate points.

10. A mutually reactive yoke means for distributing pressure from a point source to the flexible backing strip of a windshield wiper for curved glass, comprising a pair of functionally integral interlocking yokes pivoted together intermediate their ends at a central point of the backing strip for relative movement in one plane to provide a point source for application of pressure, said yokes each having outer portions extending from the pivot point to the ends of the flexible backing strip and inner portions extending oppositely from the pivot point to intermediate portions of said backing strip, and means to connect the ends of the yokes to the backing strip, one of said yokes being divided adjacent the pivot point into two separate parts which are interlocked by a holding means to form a functionally integral yoke comprising an outer and an inner portion.

References Cited in the file of this patent

UNITED STATES PATENTS

| | | |
|---|---|---|
| 2,548,090 | Anderson | Apr. 10, 1951 |
| 2,596,063 | Anderson | May 6, 1952 |

FOREIGN PATENTS

| | | |
|---|---|---|
| 957,805 | France | of 1949 |